UNITED STATES PATENT OFFICE.

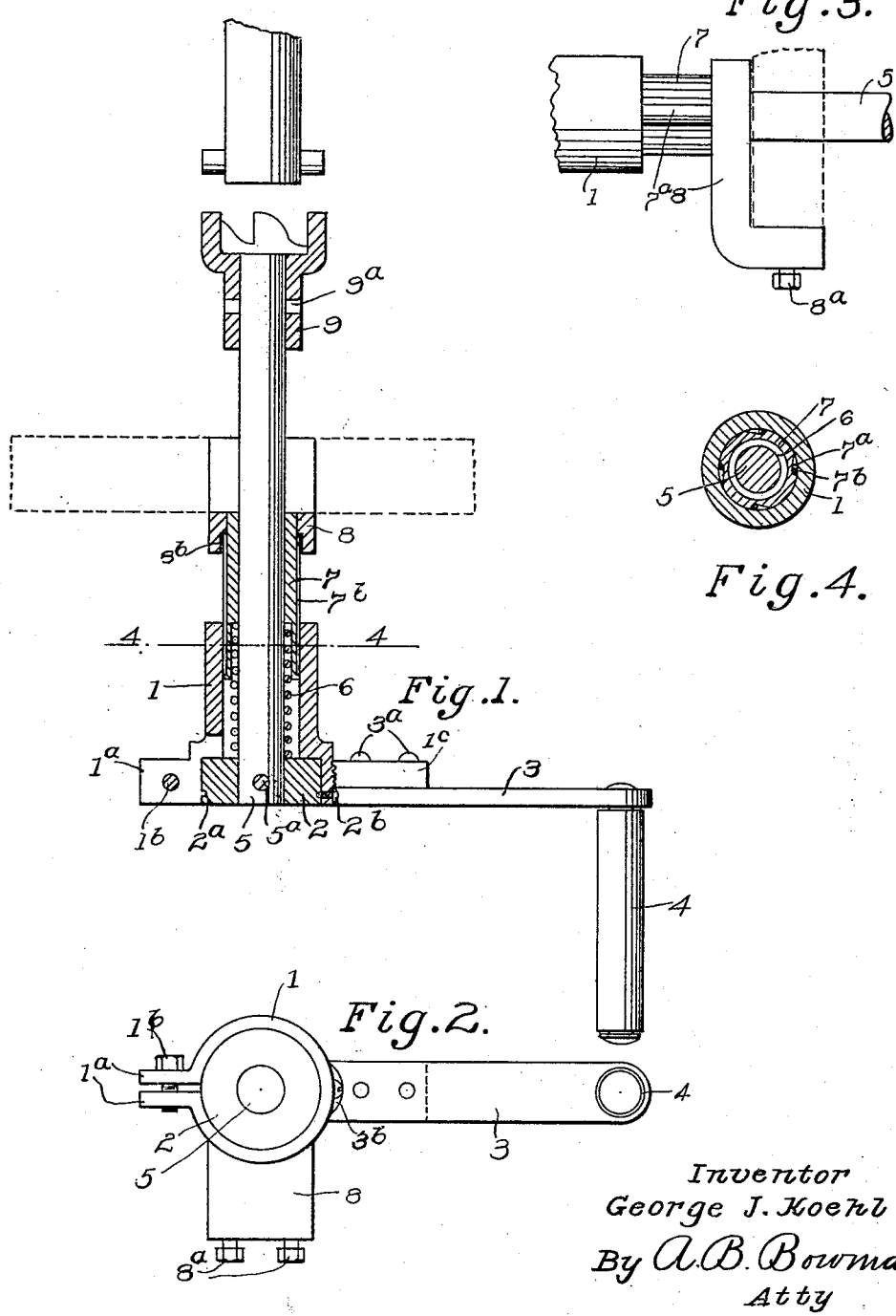
Inventor
George J. Koehl
By A.B. Bowman
Atty

GEORGE J. KOEHL, OF SAN DIEGO, CALIFORNIA, ASSIGNOR TO LIGHTENING MACHINE CO., A COPARTNERSHIP, OF SAN DIEGO COUNTY, CALIFORNIA.

CRANKING DEVICE FOR EXPLOSIVE-ENGINES.

1,271,476.     Specification of Letters Patent.     Patented July 2, 1918.

Application filed May 8, 1917. Serial No. 167,158.

*To all whom it may concern:*

Be it known that I, GEORGE J. KOEHL, a citizen of the United States, residing at San Diego, in the county of San Diego and State of California, have invented certain new and useful Improvements in Cranking Devices for Explosive-Engines, of which the following is a specification.

My invention relates to a device for cranking engines, more particularly explosive engines, and the objects of my invention are: First, to provide a cranking device for explosive engines which reduces to a minimum the liability of accident occurring to the operator in the event that the engine back fires while cranking and without additional strain on the crank shaft; second, to provide a device of this class which may be readily applied and secured in position for cranking the engine; third, to provide a device of this class which is simple and economical of construction, durable, easy to operate and will not readily deteriorate or get out of order.

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification in which:

Figure 1 is a longitudinal sectional view of my device complete showing the frame upon which it is mounted by dotted lines and showing the engine main shaft in a fragmentary form positioned ready for engagement of my device and showing portions in elevation to facilitate the illustration. Fig. 2 is a front end view of the device complete. Fig. 3 is a fragmentary side view showing particularly the means for securing the device to the frame of a vehicle, and Fig. 4 is a sectional view through 4—4 of Fig. 1.

Similar characters of reference refer to similar parts throughout the several views.

The main clamp member 1, friction member 2, crank arm 3, crank handle 4, shaft 5, spring 6, clutch member 7, support 8 and clutch member 9 constitute the principal parts of my device.

The main shaft 5 is an ordinary round shaft of suitable strength and of proper length for proper attachment to the vehicle to which it is to be applied. Secured on the one end by means of the pin $5^a$ is the friction member 2 which is an annular member provided with an annular groove $2^a$ in its outer surface into which the end of the screw $2^b$ protrudes for holding the clamp member 1 in certain position relative to said friction member when they revolve relatively to each other. Mounted over this friction member 2 is one end of the clamp member 1 which is provided with extended lugs $1^a$ which are provided with a screw $1^b$ adapted to clamp the one end of the clamp member 1 against the friction member 2 so as to provide the proper amount of friction between said members to crank the engine, but when excessive force is brought to bear thereon, it will permit the revolution of said friction member relatively to the clamp member. This clamp member is provided with a lug $1^c$, oppositely disposed to the lugs $1^a$, to which the crank arm 3 is secured by means of the bolts $3^a$. It will be here noted that the end of the arm 3 is provided with a cut away portion $3^b$ adapted for the head of the screw $2^b$ which prevents said screw $2^b$ from working out while the crank is secured in position on the clamp member 1. Said clamp member 1 extends along the shaft in cylindrical form, its inner surface being spaced some distance from the shaft 5, and mounted in this space and against the shaft 5 is the compression spring 6.

This shaft 5 is revolubly mounted in the clutch member 7. The one end of said clutch member is adapted to fit into the clamp member 1 and to reciprocate therein with the movement of the crank inwardly and outwardly by the compression and extension of the spring 6. This clutch member 7 is provided with a plurality of beveled surface grooves $7^a$ in each of which is mounted a small roller pin $7^b$ of suitable size so that when said pins are in the enlarged portion of the grooves $7^a$ they do not engage the inner surface of the clamp member 1, but when rolled outwardly on said beveled surface will engage the inner surface of the clamp member 1 and bind them together forming a clutch so that said clamp member and handle will be immediately stopped. The one end of this clutch member 7 is secured in the support 8 and said support 8 is an L shaped member which extends downwardly then backwardly at right angles as shown best in Fig. 3 of the drawings where it is secured to the frame of the vehicle and adjusted to suitable position by means of set screws 8ᵃ which will permit the proper adjustment of the support 8 on the frame. It will be here noted that sufficient clearance is left around the clutch member 7 in the support 8 at 8ᵇ to permit the pins 7ᵇ to move outwardly to clamp the member 1. Mounted on the extended inner end of the shaft 5 is the clutch member 9 secured thereto by means of the pin 9ᵃ and adapted to engage a pin in the end of the main shaft. However, the form of this clutch 9 may be made any shape or form to conform to clutch members on the end of the engine shaft, the particular shape of clutch member being no part of my present invention.

Though I have shown and described a particular construction, combination and arrangement of parts I do not wish to be limited to this particular construction, combination and arrangement, but desire to include in the purview of my invention the construction, combination and arrangement substantially as set forth in the appended claims.

It is obvious with this construction, that when the crank is turned to the right and the shaft pressed inwardly so that the clutch member engages the engine shaft that the spring 6 will be compressed and the clutch member 7 will be forced into the clamp member 1. The friction of the clamp member 1 on the friction member 2 will cause the engine shaft to revolve. If there should be a back fire the shaft in revolving in the opposite direction would cause the clutch member 7 to engage the clamp member 1, and the clutch member 7 being rigidly secured to the frame would not revolve thus preventing the revolution of the clamp member 1, but the friction member 2 with the shaft 5 would revolve in the opposite direction. The structure as a whole is very simple and economical of construction, durable, easy to operate and will not readily deteriorate or get out of order.

Having thus described my invention, what I claim as new and desire to secure by Letters Patent is:

1. In a device for cranking explosive engines, a support adapted to be readily secured to the frame of a vehicle, a clutch member secured thereto, a shaft shiftable longitudinally and revolubly mounted in said clutch member, a friction member secured to one end of said shaft, a combined clutch member and clamp member a portion of which is adapted to engage said clutch member when revolving in certain directions relative to each other and a portion clamped onto said friction member, means on the inner end of said shaft for engaging the engine drive shaft, means tending to hold said shaft out of engagement therewith and a crank secured to said clamp member.

2. In a device of the class described, the combination of a shaft, means mounted on the inner end thereof adapted to engage the main engine shaft, a clutch member secured to the frame of the vehicle, a friction member secured on the outer end of said shaft, a combined clamp and clutch member a portion of which is adapted to engage said first-mentioned clutch member when turning to the left and a portion providing frictional contact with said friction member and carrying a crank and a spring between said friction member and said clutch member on said shaft tending to hold said shaft out of engagement with said engine shaft.

3. In a device of the class described, a main revolubly mounted and longitudinally shiftable shaft, means thereon for engaging an engine shaft when turning in one direction, a crank connected with the opposite end of said shaft by frictional engagement, a clutch member secured to the frame of the vehicle, another clutch member secured to said crank shiftable longitudinally on said first clutch member and adapted to engage the same when the shaft is turned to the left, and holding said clutch member against revolution to the left.

4. In a device of the class described, a main revolubly mounted longitudinally shiftable shaft means thereon for engaging an engine shaft when turning in one direction, a crank connected with the opposite end of said shaft by frictional engagement adapted to permit movement relatively to each other under certain pressure, a clutch member secured to the frame of the vehicle, another clutch member secured to said crank adapted to engage said first mentioned clutch member when the shaft is turned to the left and holding said clutch member against revolution to the left, and a compression spring means mounted on said shaft tending to hold said shaft out of engagement with the engine shaft.

5. In a device of the class described, a main revolubly mounted shaft, means for engaging the end of the engine shaft secured on one end thereof, a friction member secured on the other end thereof provided with a circumferential groove therein, a clamp member mounted over said friction member provided with a screw therein with its inwardly extending end protruding into the groove in said friction member, a clutch member adapted to engage said clamp member rigidly secured to the frame of the vehicle and a crank secured to said clamp member.

6. In a device of the class described, a main shaft, a friction member secured rigidly thereto provided with a circumferential groove therein, a clamp member mounted over said friction member provided with a screw, the inner end of which protrudes into the groove in said friction member, and a clutch member secured to the frame of the vehicle adapted to engage said clamp member.

7. In a device of the class described, a main shaft, a friction member secured rigidly thereto provided with a circumferential groove therein, a clamp member mounted over said friction member provided with a screw, the inner end of which protrudes into the groove in said friction member, a clutch member secured to the frame of the vehicle adapted to engage said clamp member, means secured on the opposite ends of said shaft for engaging the engine shaft, means for holding said shaft out of engagement with the engine shaft, and a crank secured to said clamp member.

In testimony whereof, I have hereunto set my hand at San Diego, California, this 2d day of May, 1917.

GEORGE J. KOEHL.

Copies of this patent may be obtained for five cents each, by addressing the "Commissioner of Patents, Washington, D. C."